(12) United States Patent
Koch et al.

(10) Patent No.: US 9,477,865 B2
(45) Date of Patent: *Oct. 25, 2016

(54) SYSTEM FOR AND METHOD OF ACCURATELY DETERMINING TRUE BEARINGS OF RADIO FREQUENCY IDENTIFICATION (RFID) TAGS ASSOCIATED WITH ITEMS IN A CONTROLLED AREA

(71) Applicant: SYMBOL TECHNOLOGIES, INC., Lincolnshire, IL (US)

(72) Inventors: Michael J Koch, Ft. Salonga, NY (US); Benjamin J Bekritsky, Modiin (IL); Alexander M Jacques, Kings Park, NY (US); Charles B Swope, Coral Springs, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/106,368

(22) Filed: Dec. 13, 2013

(65) Prior Publication Data

US 2015/0169910 A1 Jun. 18, 2015

(51) Int. Cl.
*G06K 7/10* (2006.01)
*G01S 13/75* (2006.01)
(Continued)

(52) U.S. Cl.
CPC .......... *G06K 7/10415* (2013.01); *G01S 3/46* (2013.01); *G01S 13/75* (2013.01); *G01S 13/751* (2013.01);
(Continued)

(58) Field of Classification Search
CPC ............... G06K 7/10415; G06K 7/10099; G06K 7/10128; G06K 7/10366; G01S 3/46; G01S 13/75; G01S 13/751; G01S 13/825; G01S 3/16
USPC ........................................... 340/10.1
See application file for complete search history.

(56) References Cited

U.S. PATENT DOCUMENTS 7,928,894 B1 4/2011 Fox
8,248,306 B2 8/2012 Legay
(Continued)

FOREIGN PATENT DOCUMENTS

CA 2615245 A1 6/2008
WO 9200531 1/1992
(Continued)

OTHER PUBLICATIONS

EPC™ Radio-Frequency Identity Protocols Class-1 Generation-2 UHF RFID Protocol for Communications at 860 MHz-960 MHz; Version 1.2.0; GS1 EPC Global Specification for RFID Air Interface; 108 pages; Oct. 23, 2008.
(Continued)

*Primary Examiner* — Edwin Holloway, III

(57) ABSTRACT

A radio frequency (RF) identification (RFID) tag reading system and method accurately determine true bearings of RFID tags associated with items in a controlled area. An RFID reader has an array of antenna elements and a plurality of RF transceivers. A controller controls the transceivers by steering a primary transmit beam over the controlled area by transmitting a primary transmit signal to each tag, and steering a primary receive beam at a primary steering angle by receiving a primary receive signal from each tag. The controller thereupon steers a plurality of secondary receive offset beams at different secondary steering angles that are offset from the primary steering angle by receiving secondary receive offset signals from each tag, and by processing the offset signals to determine a true bearing for each tag.

20 Claims, 6 Drawing Sheets

(51) Int. Cl.
    *G01S 13/82* (2006.01)
    *G01S 3/46* (2006.01)
    *G01S 3/16* (2006.01)
(52) U.S. Cl.
    CPC ......... *G01S 13/825* (2013.01); *G06K 7/10099* (2013.01); *G06K 7/10128* (2013.01); *G06K 7/10366* (2013.01); *G01S 3/16* (2013.01)

(56) References Cited

U.S. PATENT DOCUMENTS

| | | |
|---|---|---|
| 8,493,182 B2 | 7/2013 | Hofer et al. |
| 8,577,308 B2 | 11/2013 | Choi |
| 8,587,495 B2 | 11/2013 | Faraone et al. |
| 9,111,190 B2* | 8/2015 | Jacques .................... G01S 3/28 |
| 2008/0157934 A1 | 7/2008 | Posamentier |
| 2008/0157970 A1* | 7/2008 | Single .................. G01S 5/0263 340/572.1 |
| 2009/0002165 A1 | 1/2009 | Tuttle |
| 2010/0039228 A1* | 2/2010 | Sadr .......................... G01S 5/12 340/10.1 |
| 2010/0123617 A1 | 5/2010 | Yu et al. |
| 2010/0188211 A1 | 7/2010 | Brommer et al. |
| 2010/0231410 A1 | 9/2010 | Seisenberger et al. |
| 2011/0050421 A1 | 3/2011 | Duron et al. |
| 2011/0169613 A1* | 7/2011 | Chen ................... G01S 13/4445 340/10.4 |
| 2012/0189078 A1 | 7/2012 | Eom |
| 2012/0262358 A1 | 10/2012 | Wallner |
| 2013/0106671 A1 | 5/2013 | Eom |
| 2013/0201003 A1 | 8/2013 | Sabesan et al. |
| 2015/0278565 A1* | 10/2015 | Bekritsky .......... G06K 7/10366 340/10.32 |
| 2015/0323662 A1* | 11/2015 | Swope ............... G06K 7/10366 342/158 |
| 2016/0003930 A1* | 1/2016 | Swope ..................... G01S 3/14 342/368 |

FOREIGN PATENT DOCUMENTS

| | | |
|---|---|---|
| WO | 2008082434 A2 | 7/2008 |
| WO | 2009151778 A2 | 12/2009 |
| WO | 2011135328 A2 | 11/2011 |
| WO | 2014003363 A1 | 7/2014 |

OTHER PUBLICATIONS

International Search Report and Written Opinion dated Mar. 6, 2015 in counterpart application PCT/US2014/069112.

* cited by examiner

US 9,477,865 B2

SYSTEM FOR AND METHOD OF ACCURATELY DETERMINING TRUE BEARINGS OF RADIO FREQUENCY IDENTIFICATION (RFID) TAGS ASSOCIATED WITH ITEMS IN A CONTROLLED AREA

BACKGROUND OF THE INVENTION

The present disclosure relates generally to a system for, and a method of, determining true bearings of radio frequency (RF) identification (RFID) tags associated with items in a controlled area, especially for inventory control of the RFID-tagged items, by using an array of antenna elements for better RF coverage.

Radio frequency (RF) identification (RFID) technology is becoming increasingly important for logistics concerns, material handling and inventory management in retail stores, warehouses, distribution centers, buildings, and like controlled areas. An RFID system typically includes an RFID reader, also known as an RFID interrogator, and preferably a plurality of such readers distributed about the controlled area. Each RFID reader interrogates one or more RFID tags in its coverage range. Each RFID tag is usually attached to, or associated with, an individual item, or to a package for the item, or to a pallet or container for multiple items. Each RFID reader transmits an RF interrogating signal, and each RFID tag, which senses the interrogating RF signal, responds by transmitting a return RF signal. The RFID tag either generates the return RF signal originally, or reflects back a portion of the interrogating RF signal in a process known as backscatter. The return RF signal may further encode data stored internally in the tag. The return signal is demodulated and decoded into data by each reader, which thereby identifies, counts, or otherwise interacts with the associated item. The decoded data can denote a serial number, a price, a date, a destination, other attribute(s), or any combination of attributes, and so on.

The RFID tag typically includes an antenna, a power management section, a radio section, and frequently a logic section, a memory, or both. In earlier RFID tags, the power management section included an energy storage device, such as a battery. An RFID tag with an active transmitter is known as an active tag. An RFID tag with a passive transmitter is known as a passive tag and backscatters. Advances in semiconductor technology have miniaturized the electronics so much that an RFID tag can be powered solely by the RF signal it receives. An RFID tag that backscatters and is powered by an on-board battery is known as a semi-passive tag.

The RFID system is often used in an inventory monitoring application. For example, in order to take inventory of RFID-tagged items in a retail store, it is known to position at least one RFID reader in a controlled area, and then, to allow each reader to automatically read whatever tagged items are in the coverage range of each reader. For superior RF coverage, it is known to provide each reader with an array of antenna elements that transmit the RF interrogating signal as a primary transmit beam that is electronically steered both in azimuth, e.g., over an angle of 360 degrees, and in elevation, e.g., over an angle of about 90 degrees, and that receive the return RF signal as a primary receive beam from the tags.

As advantageous as such known inventory-taking RFID systems utilizing antenna arrays have been, it has proven difficult in practice to very accurately determine the true bearing, i.e., the angular direction both in azimuth and elevation, of a particular tag, relative to a particular reader. There is a practical limit on the number of antenna elements that can be used in each array. This antenna element limit causes each primary transmit beam and each corresponding primary receive beam to have a relatively broad beam width. The primary transmit beam is typically steered until the reader reads the tag with the highest or peak receive signal strength (RSS) of the primary receive beam at a primary steering angle. However, determining the bearing, i.e., the angular direction both in azimuth and elevation, of a tag based on the peak RSS of the primary receive beam is imprecise due to the aforementioned relatively broad beam width. Bearing errors on the order of 5 to 10 degrees have been reported and are not tolerable in many applications.

Accordingly, there is a need to more accurately and finely determine the true bearings of RFID tags despite the practical limit on the number of antenna elements that can be used in an antenna array and despite the relatively broad beam width of the primary transmit and receive beams.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
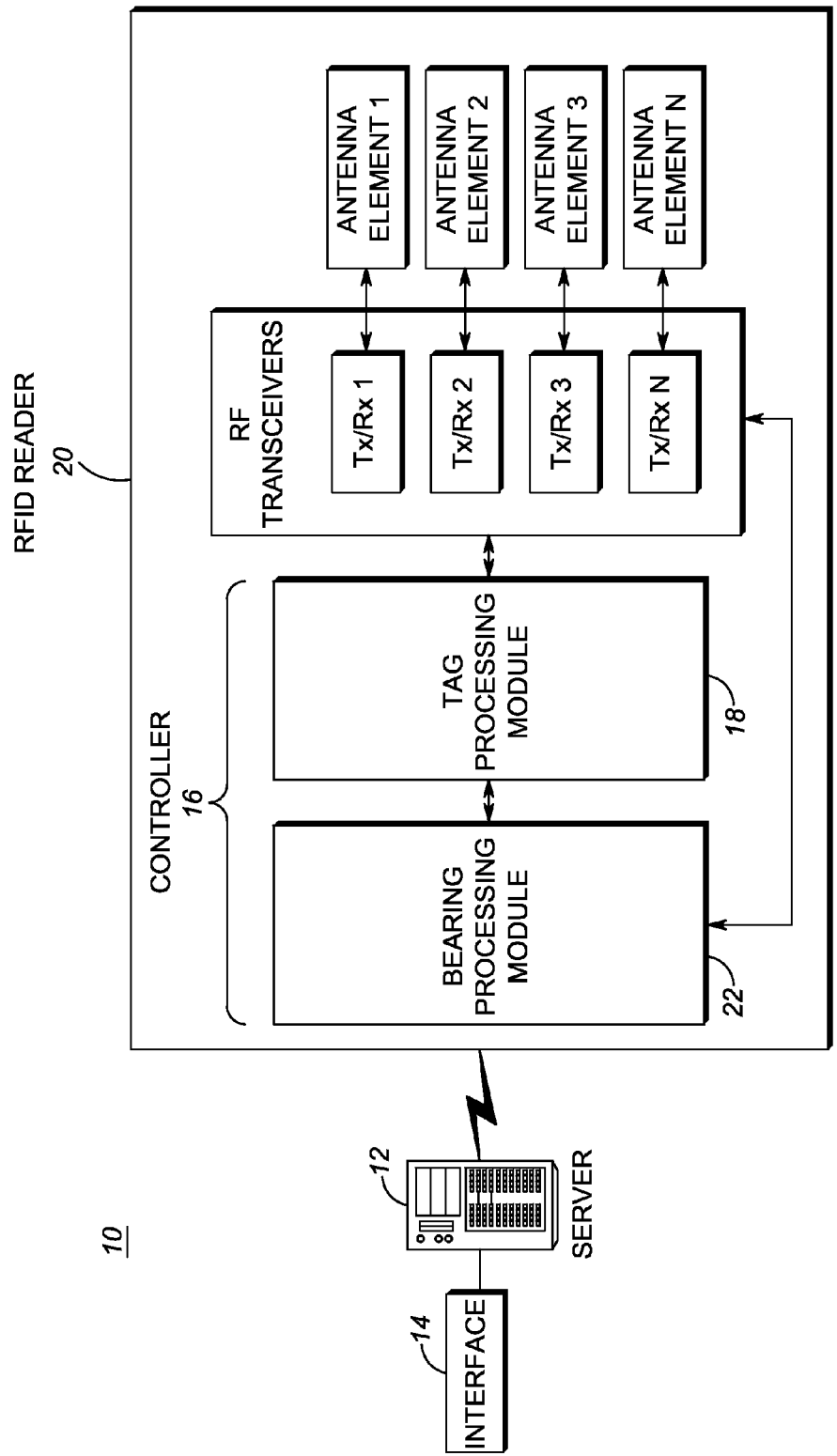
FIG. 1 is a schematic view of an exemplary radio frequency identification (RFID) tag reading system for determining true bearings of RFID tags in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to a radio frequency (RF) identification (RFID) tag reading system for accurately determining true bearings of RFID tags associated with items in a controlled area. The controlled area may be a retail store, a warehouse, or any other confined or open area in which RFID-tagged items are to be monitored. The system includes an RFID reader having an array of antenna elements, e.g., a phased array; a plurality of RF transceivers; and a controller or programmed microprocessor operatively connected to the transceivers, and operative for controlling the transceivers in one or more scans or modes of operation.

The controller initially executes a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag. The controller thereupon executes a bearing processing module operative for steering a plurality of secondary receive offset beams at different secondary steering angles that are offset from the primary steering angle by receiving a plurality of secondary receive offset signals via the antenna elements from each tag, and by processing the secondary receive offset signals to determine a true bearing for each tag.

More particularly, the bearing processing module is operative for steering a first pair of the secondary receive offset beams at opposite sides of the primary receive beam in elevation, and for processing a first pair of the secondary receive offset signals to obtain a pair of elevation offset signals. The bearing processing module is further operative for steering a second pair of the secondary receive offset beams at opposite sides of the primary receive beam in azimuth, and for processing a second pair of the secondary receive offset signals to obtain a pair of azimuth offset signals. The bearing processing module is still further operative for processing the elevation offset signals by dividing their difference by their sum to obtain an elevation error signal as an elevation correction to the primary steering angle, and for processing the azimuth offset signals by dividing their difference by their sum to obtain an azimuth error signal as an azimuth correction to the primary steering angle. Thus, the primary steering angle is corrected by these error signals, thereby resulting in the true bearing for each tag.

In a preferred embodiment, the bearing processing module is operative for steering each secondary receive offset beam by receiving the secondary receive offset signals over a plurality of channels, e.g., four channels. A complex multiplier and a programmable device for setting a complex coefficient for the complex multiplier are provided on each channel, to introduce a weighting factor on each channel to effect steering.

The system includes a server operatively connected to the RFID reader, and the bearing processing module is implemented in either the RFID reader and/or the server. The RFID reader is preferably mounted in an overhead location of the controlled area and, depending on the application, a plurality of RFID readers may be deployed in the controlled area.

A method, in accordance with another aspect of this disclosure, relates to a radio frequency (RF) identification (RFID) tag reading method of accurately determining true bearings of RFID tags associated with items in a controlled area. The method is performed by mounting an RFID reader having an array of antenna elements and a plurality of RF transceivers, in the controlled area; controlling the transceivers by having a controller execute a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag; and controlling the transceivers by having the controller execute a bearing processing module operative for steering a plurality of secondary receive offset beams at different secondary steering angles that are offset from the primary steering angle by receiving a plurality of secondary receive offset signals via the antenna elements from each tag, and by processing the secondary receive offset signals to determine a true bearing for each tag.

Turning now to the drawings, FIG. 1 depicts a simplified depiction of a radio frequency (RF) identification (RFID) tag reading system 10 for accurately determining true bearings of RFID tags associated with items to be tracked or monitored. The system 10 has an RFID reader 20 connected to a server or host 12 and a user interface 14. The RFID reader 20 has an array of antenna elements 1, 2, 3 . . . , N, preferably a phased array. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, sixteen antenna elements and sixteen transceivers may be employed. Although FIG. 1 depicts one transceiver for each antenna element, this need not be the case. The number of transceivers may be different from the number of antenna elements. For example, a particular transceiver may be shared with two or more antenna elements.

A controller or programmed microprocessor 16 is operatively connected to the transceivers to control their operation in one or more scans or modes of operation, as described below. The controller 16 executes a software-based, tag processing module 18 during a coarse scan, and also executes a software-based, bearing processing module 22 during a fine scan. The modules 18 and 22 need not be software-based, but either or both of them could be hardware-based, or could be implemented in both software and hardware. The coarse and fine scans need not be separate distinct scans, but can be successively performed in a single scan. Although the bearing processing module 22 is depicted in FIG. 1 as being implemented in the RFID reader 20, it will be understood that the bearing processing module 22, either in whole or in part, can also be implemented in the server 12.

Figure 2:
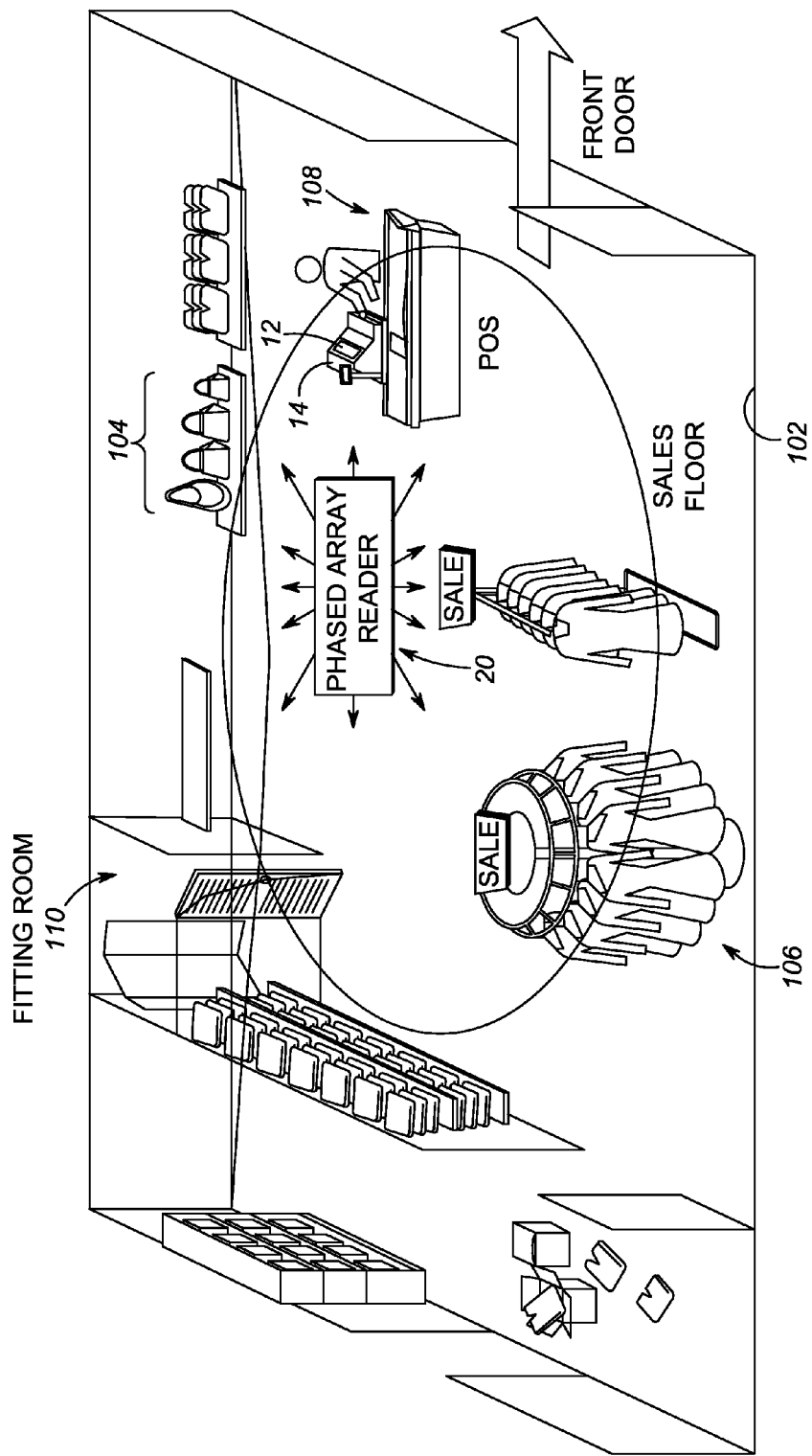
FIG. 2 is a perspective, schematic view of the system of FIG. 1 installed in an exemplary controlled area, especially for inventory control of RFID-tagged items.

FIG. 2 depicts an exemplary depiction of the RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor. Each RFID-tagged item 104, 106 is preferably associated with a passive RFID tag for cost reasons, although other types of RFID tags, as described above, may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 advantageously includes a wireless RF transceiver that communicates with the reader 20. For example, Wi-Fi and Bluetooth® are open wireless standards for exchanging data between electronic devices.

Figure 3A:
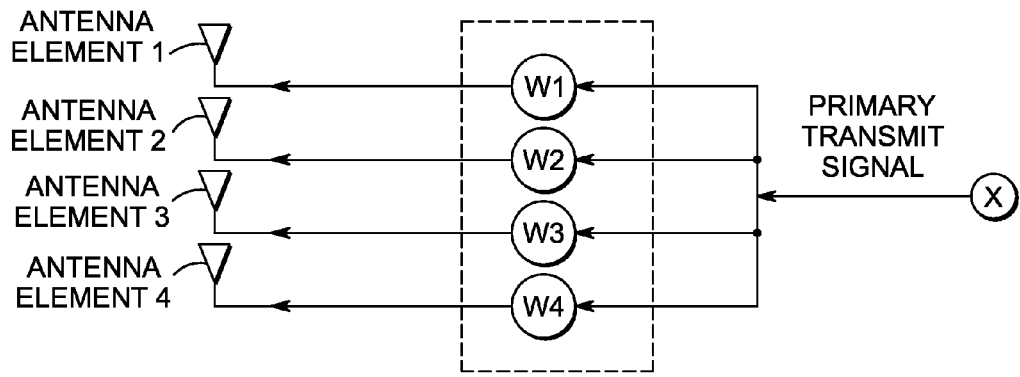
FIG. 3A is a schematic diagram depicting components of the overall system of FIG. 1 during transmission of the primary transmit beam.
Figure 3B:
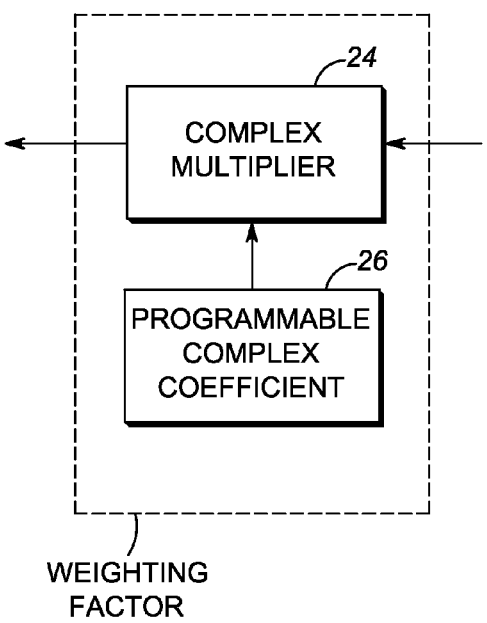
FIG. 3B is a block diagram depicting a detail of a weighting factor component for use in beam steering in the system.

During execution of the aforementioned initial or coarse scan, the controller 16 executes the tag processing module 18 by which the transceivers are commanded to act as a primary transmit beam steering unit operative for steering a primary transmit beam over the controlled area 102 by transmitting a primary transmit signal (X) via the antenna elements to each tag. As shown in FIG. 3A, the primary transmit signal (X) is conducted along different channels (in this example, four) to a plurality of the antenna elements 1, 2, 3 and 4. Steering is accomplished by introducing a different weighting factor W1, W2, W3 and W4 on each channel. As shown in FIG. 3B, each weighting factor is generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known in the art, and details thereof can be obtained, for example, by reference to U.S. Pat. No. 8,587, 495 and/or to "A Primer on Digital Beamforming", by Toby Haynes, in Spectrum Signal Processing, Mar. 26, 1998, the entire contents of said patent and said primer being incorporated herein by reference thereto.

Figure 4:
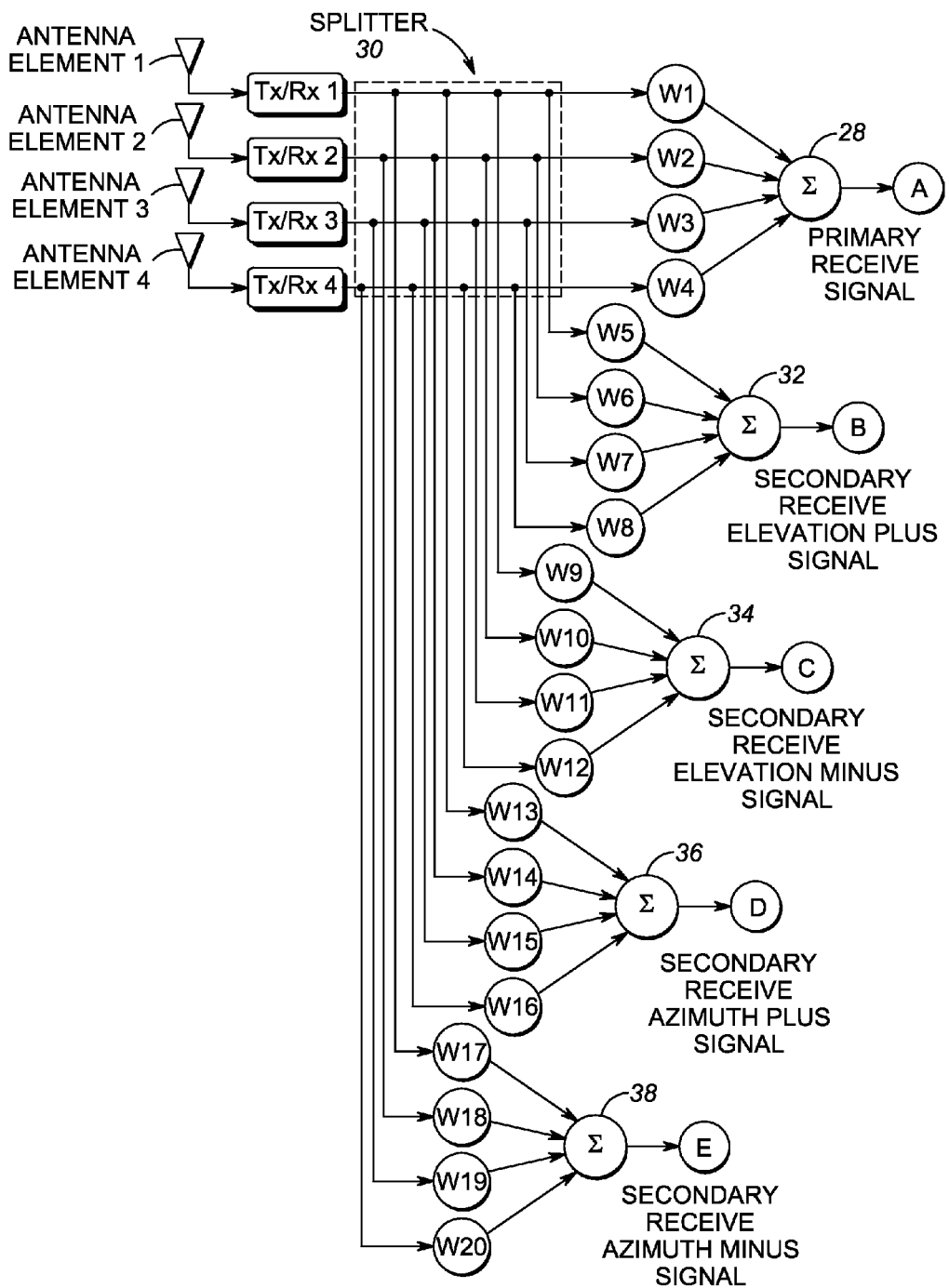
FIG. 4 is a schematic diagram depicting components of the overall system of FIG. 1 during reception of the primary receive beam, as well as of additional secondary receive beams.

During the coarse scan, the controller 16 also executes the tag processing module 18 by which the transceivers are commanded to act as a primary receive beam steering unit operative for steering a primary receive beam at a primary steering angle by receiving a primary receive signal (A) via the antenna elements from each tag. As shown in FIG. 4, the antenna elements 1, 2, 3 and 4 receive return signals from each interrogated tag along different channels (in this example, four), and then a different weighting factor W1, W2, W3 and W4 is introduced on each channel before all the weighted return signals are summed in an adder 28 in order to generate the primary receive signal (A). Each weighting factor is generated by the circuit of FIG. 3B. Steering of the primary receive beam is effected by the weighting factors W1, W2, W3 and W4. As illustrated, the weighting factors (FIG. 4) used in steering the primary receive beam is, in a preferred embodiment, the same as the weighting factors (FIG. 3A) used in steering the primary transmit beam. As a result, the steering angle for both the primary transmit beam and the primary receive beam is the same, or nearly so, i.e., they have a common boresight or general bearing. However, it will be understood that the weighting factors used in steering the primary receive beam may be different from the weighting factors used in steering the primary transmit beam, in which case, the steering angle for the primary transmit beam is different from the steering angle for the primary receive beam.

As described above, the practical limit on the number N of antenna elements that can be used in the array causes the primary transmit beam and the corresponding primary receive beam to each have a relatively broad beam width, thereby rendering it difficult in practice to very accurately determine the true bearing, i.e., the angular direction both in azimuth and elevation, of a particular tag, relative to the reader. Bearing errors on the order of 5 to 10 degrees have been reported and are not tolerable in many applications. This disclosure is directed to reducing such errors, preferably to less than one degree.

In accordance with this disclosure, and as further shown in FIG. 4, the return signals from each interrogated tag from the antenna elements 1, 2, 3 and 4 are conducted through respective RF transceivers Tx/Rx 1, Tx/Rx 2, Tx/Rx 3, Tx/Rx 4, to a splitter 30, and then routed to four sub-circuits to simultaneously generate four different secondary receive signals, and four different secondary receive beams that are offset from the primary receive beam, as described below. Thus, the return signals are conducted from the splitter 30 to weighting factors W5, W6, W7 and W8 before being summed in an adder 32 to generate a secondary receive plus elevation signal (B), to weighting factors W9, W10, W11 and W12 before being summed in an adder 34 to generate a secondary receive minus elevation signal (C), to weighting factors W13, W14, W15 and W16 before being summed in an adder 36 to generate a secondary receive plus azimuth signal (D), and to weighting factors W17, W18, W19 and W20 before being summed in an adder 38 to generate a secondary receive minus azimuth signal (E). Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20.

Each weighting factor W5 through W20 is generated by a circuit identical to that depicted in FIG. 3B. The weighting factors W5, W6, W7 and W8 are selected such that the secondary receive offset beam formed by the plus elevation signal (B) has a steering angle that is located a few degrees, e.g., ten degrees, in one direction away from the elevation of the primary steering angle of the primary receive beam, and the weighting factors W9, W10, W11 and W12 are selected such that the secondary receive offset beam formed by the minus elevation signal (C) has a steering angle that is located a few degrees, e.g., ten degrees, in an opposite direction away from the elevation of the primary steering angle of the primary receive beam. The weighting factors W13, W14, W15 and W16 are selected such that the secondary receive offset beam formed by the plus azimuth signal (D) has a steering angle that is located a few degrees, e.g., ten degrees, in one direction away from the azimuth of the primary steering angle of the primary receive beam. The weighting factors W17, W18, W19 and W20 are selected such that the secondary receive offset beam formed by the minus azimuth signal (E) has a steering angle that is located a few degrees, e.g., ten degrees, in an opposite direction away from the azimuth of the primary steering angle of the primary receive beam.

Thus, four secondary receive offset beams have been formed. The offset beams formed by the plus and minus elevation signals (B) and (C) bracket the elevation of the primary receive beam. The offset beams formed by the plus and minus azimuth signals (D) and (E) bracket the azimuth of the primary receive beam.

Figure 5:
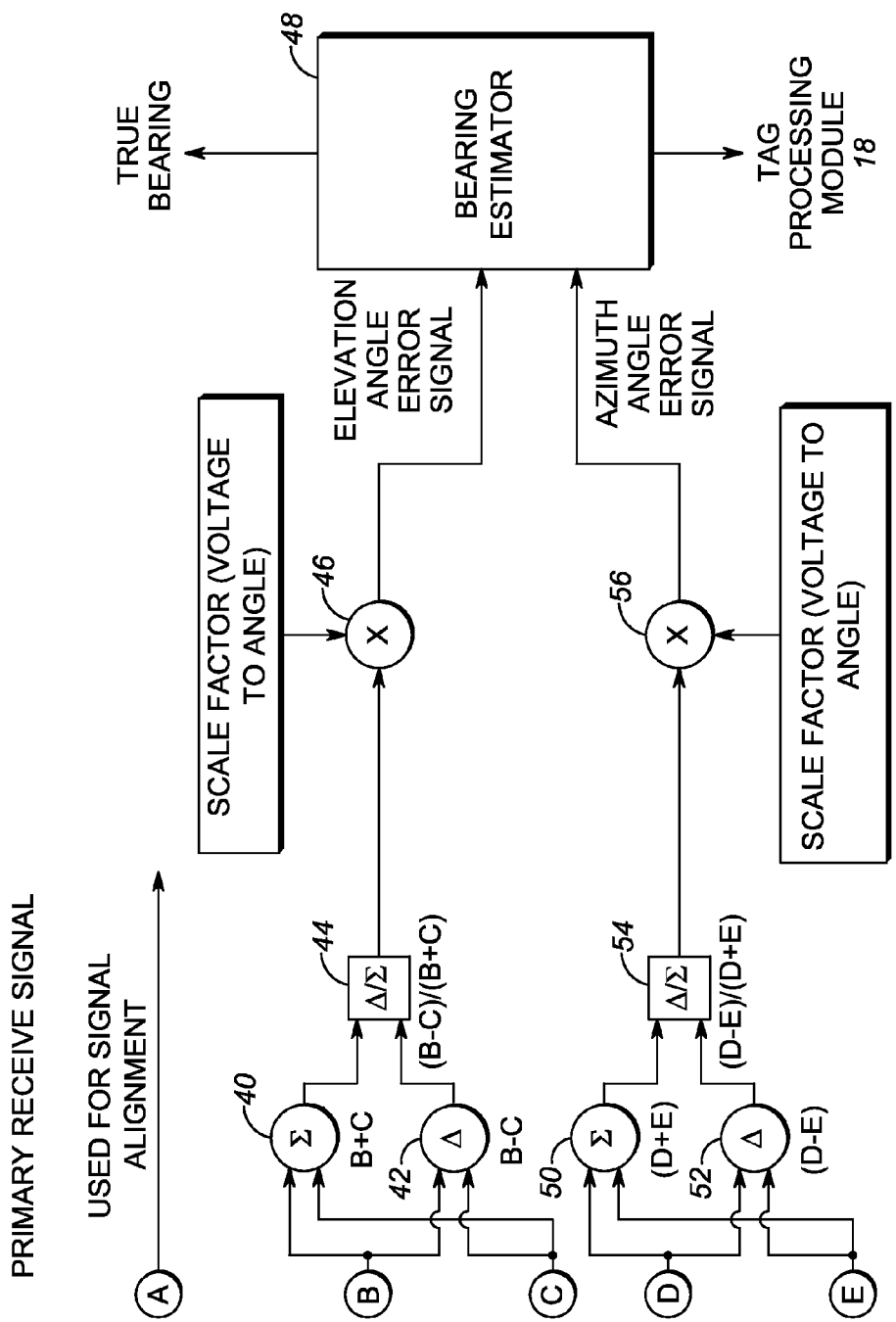
FIG. 5 is a block diagram depicting signal processing of the primary and the secondary receive beams depicted in FIG. 4 to obtain a true bearing for each RFID-tagged item.

Turning now to FIG. 5, the elevation signals (B) and (C) and the azimuth signals (D) and (E) are separately processed to obtain elevation and azimuth bearing correction factors used to determine the true bearing of each interrogated tag. Thus, the elevation signals (B) and (C) are summed in an adder 40, and are differenced from each other in a subtractor 42. A divider 44 divides the difference (B−C) from the subtractor 42 by the sum (B+C) from the adder 40, and the output of the divider 44, which is a voltage, is converted to an angle by a converter 46, thereby yielding an elevation angle error signal that is input to a bearing estimator 48. Also, the azimuth signals (D) and (E) are summed in an adder 50, and are differenced from each other in a subtractor 52. A divider 54 divides the difference (D−E) from the subtractor 52 by the sum (D+E) from the adder 50, and the output of the divider 54, which is a voltage, is converted to an angle by a converter 56, thereby yielding an azimuth angle error signal that is input to the bearing estimator 48. The bearing estimator 48 compares the two elevation and azimuth angle error signals against the elevation and azimuth of the primary receive signal (A), and outputs a true bearing for each interrogated tag. This output can be stored, or sent to the server 12, or it can be sent to the tag processing module 18 for beam steering.

As described so far, four of the antenna elements are employed to steer the four secondary receive offset beams around the primary transmit and receive beams. If sixteen antenna elements are employed in the array, then a switch is used to switch the same four RF transceivers to four of the sixteen antenna elements. At any given time, four out of the sixteen antenna elements are active, while the remaining twelve antenna elements are inactive. These four antenna elements are effectively working in one volume or sector of space in the controlled area 102. The remaining antenna elements in the array could be working, either successively or simultaneously, in the same or in different volumes or sectors of space in the controlled area. The antenna elements work in groups, typically four at a time, and advantageously, there may be overlap between antenna elements in the different groups. It will be understood that this disclosure is not intended to be limited to a group of four antenna elements, because a different number or group of antenna elements, and a different number or group of secondary receive offset beams, could be employed.

As described above, four separate subcircuits are employed, as shown in FIG. 4, to simultaneously generate the two elevation signals (B) and (C) and the two azimuth signals (D) and (E), and to simultaneously steer their secondary offset beams. In a time-multiplexed variation, one or more such subcircuits can be shared. For example, only one such subcircuit could be employed, and different sets of weighting factors could be sequentially applied at the one such subcircuit to sequentially generate the signals (B), (C), (D) and (E), and to sequentially steer their secondary offset beams.

Figure 6:
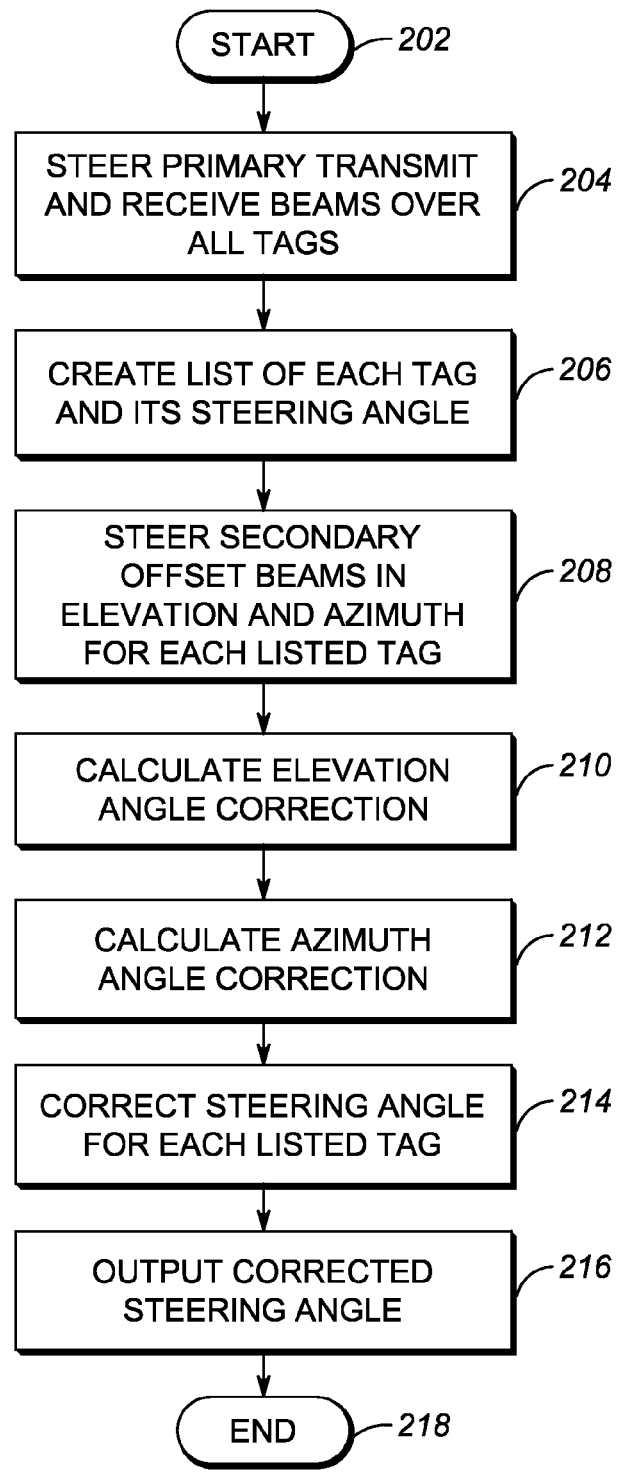
FIG. 6 is a flow chart depicting steps performed in accordance with a method of accurately determining true bearings of RFID tags associated with items in the controlled area in accordance with the present disclosure.

As described above, and as shown in the flow chart 200 of FIG. 6, beginning at start step 202, the RFID system 10 accurately determines the true bearings of RFID tags associated with the items 104, 106 in the controlled area 102 by steering the primary transmit beam and the primary receive beam over all the tags (step 204), and by creating a list of all the tags that were read, together with the primary steering angle of the primary receive beam having the highest RSSI level for each tag that was read (step 206). Then, for each such listed tag, the system steers a set of secondary receive offset beams at steering angles that are offset in elevation and azimuth relative to the elevation and azimuth of the primary steering angle of the primary receive beam (step 208). The listed tags may be re-read, once or multiple times, for each offset beam. Then, for each listed tag, the system calculates an elevation angle correction for the elevation of the primary steering angle (step 210) by dividing a difference and a sum of receive elevation offset signals for the elevation offset beams. Similarly, for each listed tag, the system calculates an azimuth angle correction to the azimuth of the primary steering angle (step 212) by dividing a difference and a sum of receive azimuth offset signals for the azimuth offset beams. Next, the steering angle is corrected for each listed tag (step 214), and the corrected steering angle, i.e., the true bearing for each listed tag is output (step 216). The method ends at step 218.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for accurately determining true bearings of RFID tags associated with items in a controlled area, comprising:

an RFID reader having an array of antenna elements and a plurality of RF transceivers; and a controller operatively connected to the transceivers, and operative for controlling the transceivers by executing a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag, and the controller being further operative for controlling the transceivers by executing a bearing processing module operative for steering a plurality of secondary receive offset beams at different secondary steering angles that are offset from the primary steering angle by receiving at least four secondary receive offset signals from at least four antenna elements from each tag, and by processing the at least four secondary receive offset signals to determine a true bearing for each tag.

2. The system of claim 1, wherein the tag processing module is operative during a coarse scan, and wherein the bearing processing module is operative during a fine scan.

3. The system of claim 1, wherein the bearing processing module is operative for steering a first pair of the secondary receive offset beams at opposite sides of the primary receive beam in elevation, and for processing a first pair of the secondary receive offset signals to obtain a pair of elevation offset signals; and wherein the bearing processing module is further operative for steering a second pair of the secondary receive offset beams at opposite sides of the primary receive beam in azimuth, and for processing a second pair of the secondary receive offset signals to obtain a pair of azimuth offset signals.

4. The system of claim 3, wherein the bearing processing module is operative for processing the elevation offset signals by dividing their difference by their sum to obtain an elevation error signal as an elevation correction to the primary steering angle, and wherein the bearing processing module is operative for processing the azimuth offset signals by dividing their difference by their sum to obtain an azimuth error signal as an azimuth correction to the primary steering angle.

5. The system of claim 1, wherein the bearing processing module is operative for steering each secondary receive offset beam by receiving the secondary receive offset signals over a plurality of channels; and further comprising, on each channel, a complex multiplier and a programmable device for setting a complex coefficient for the complex multiplier to introduce a weighting factor on each channel to effect steering.

6. The system of claim 1, and a server operatively connected to the RFID reader, and wherein the bearing processing module is implemented in at least one of the RFID reader and the server.

7. The system of claim 1, wherein the bearing processing module is operative for steering the offset beams in at least one of a sequential and a simultaneous manner.

8. A radio frequency (RF) identification (RFID) tag reading system for accurately determining true bearings of RFID tags associated with items in a controlled area, comprising:

an RFID reader mounted in an overhead location in the controlled area, and having an array of antenna elements and a plurality of RF transceivers;

a server operatively connected to the RFID reader; and a controller located in at least one of the RFID reader and the server and operatively connected to the transceivers, the controller being operative for controlling the transceivers by executing a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag, and the controller being further operative for controlling the transceivers by executing a bearing processing module operative for steering a plurality of secondary receive offset beams at different secondary steering angles that are offset from the primary steering angle by receiving at least four secondary receive offset signals from at least four antenna elements from each tag, and by processing the at least four secondary receive offset signals to determine a true bearing for each tag.

9. The system of claim 8, wherein the tag processing module is operative during a coarse scan, and wherein the bearing processing module is operative during a fine scan.

10. The system of claim 8, wherein the bearing processing module is operative for steering a first pair of the secondary receive offset beams at opposite sides of the primary receive beam in elevation, and for processing a first pair of the secondary receive offset signals to obtain a pair of elevation offset signals; and wherein the bearing processing module is further operative for steering a second pair of the secondary receive offset beams at opposite sides of the primary receive beam in azimuth, and for processing a second pair of the secondary receive offset signals to obtain a pair of azimuth offset signals.

11. The system of claim 10, wherein the bearing processing module is operative for processing the elevation offset signals by dividing their difference by their sum to obtain an elevation error signal as an elevation correction to the primary steering angle, and wherein the bearing processing module is operative for processing the azimuth offset signals by dividing their difference by their sum to obtain an azimuth error signal as an azimuth correction to the primary steering angle.

12. The system of claim 8, wherein the bearing processing module is operative for steering each secondary receive offset beam by receiving the secondary receive offset signals over a plurality of channels; and further comprising, on each channel, a complex multiplier and a programmable device for setting a complex coefficient for the complex multiplier to introduce a weighting factor on each channel to effect steering.

13. A radio frequency (RF) identification (RFID) tag reading method of accurately determining true bearings of RFID tags associated with items in a controlled area, comprising:

mounting an RFID reader having an array of antenna elements and a plurality of RF transceivers, in the controlled area;

controlling the transceivers by having a controller execute a tag processing module operative for steering a primary transmit beam over the controlled area by transmitting a primary transmit signal via the antenna elements to each tag, and for steering a primary receive beam at a primary steering angle by receiving a primary receive signal via the antenna elements from each tag; and controlling the transceivers by having the controller execute a bearing processing module operative for steering a plurality of secondary receive offset beams at different secondary steering angles that are offset from the primary steering angle by receiving at least four secondary receive offset signals from at least four antenna elements from each tag, and by processing the at least four secondary receive offset signals to determine a true bearing for each tag.

14. The method of claim 13, wherein the tag processing module is operative during a coarse scan, and wherein the bearing processing module is operative during a fine scan.

15. The method of claim 13, wherein the steering of a first pair of the secondary receive offset beams is performed at opposite sides of the primary receive beam in elevation, and wherein the processing of a first pair of the secondary receive offset signals is performed to obtain a pair of elevation offset signals; and wherein the steering of a second pair of the secondary receive offset beams is performed at opposite sides of the primary receive beam in azimuth, and wherein the processing of a second pair of the secondary receive offset signals is performed to obtain a pair of azimuth offset signals.

16. The method of claim 15, wherein the processing of the elevation offset signals is performed by dividing their difference by their sum to obtain an elevation error signal as an elevation correction to the primary steering angle, and wherein the processing of the azimuth offset signals is performed by dividing their difference by their sum to obtain an azimuth error signal as an azimuth correction to the primary steering angle.

17. The method of claim 13, wherein the steering of each secondary receive offset beam is performed by receiving the secondary receive offset signals over a plurality of channels; and introducing a weighting factor on each channel to effect steering.

18. The method of claim 13, and operatively connecting a server to the RFID reader, and implementing the bearing processing module in at least one of the RFID reader and the server.

19. The method of claim 13, wherein the steering of the offset beams is performed in at least one of a simultaneous and a sequential manner.

20. The method of claim 14, and creating a list of the tags in the controlled area during the coarse scan, and wherein the steering of the offset beams is performed for each listed tag.

* * * * *